(12) United States Patent
Schildkraut et al.

(10) Patent No.: US 6,292,574 B1
(45) Date of Patent: Sep. 18, 2001

(54) COMPUTER PROGRAM PRODUCT FOR REDEYE DETECTION

(75) Inventors: Jay S. Schildkraut; Robert T. Gray; Jiebo Luo, all of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 08/919,560

(22) Filed: Aug. 29, 1997

(51) Int. Cl.[7] ....................................... G06K 9/00
(52) U.S. Cl. .................. 382/117; 382/103; 382/167; 382/173; 382/274
(58) Field of Search ........................ 382/103, 117, 382/118, 159, 167, 190, 193, 173, 274

(56) References Cited

U.S. PATENT DOCUMENTS

| | | | |
|---|---|---|---|
| 5,089,976 | * 2/1992 | Cate et al. | 356/402 |
| 5,128,711 | * 7/1992 | Terashita et al. | 354/410 |
| 5,130,789 | * 7/1992 | Dobbs et al. | 358/500 |
| 5,130,935 | * 7/1992 | Takiguchi | 382/167 |
| 5,150,433 | * 9/1992 | Daly | 382/18 |
| 5,293,427 | * 3/1994 | Ueno et al. | 382/103 |
| 5,432,863 | * 7/1995 | Benati | 382/54 |
| 5,680,481 | * 10/1997 | Prasad et al. | 382/190 |
| 5,724,456 | * 3/1998 | Boyack et al. | 382/254 |
| 5,990,973 | * 11/1999 | Sakamoto | 348/576 |
| 6,009,209 | 12/1999 | Acker et al. | 382/275 |
| 6,016,354 | 1/2000 | Lin et al. | 382/117 |

OTHER PUBLICATIONS

G. Marcone et al., "automatic face image recognition : an accurate eye location procedure", IEEE 1977, pp. 515–517, Jun. 1997.*

Jie Yang et al., "A real–time face tracker", IEEE, (pp. 142–147), May, 1996.*

"Computer Graphics Principles and Practice 2nd ed.", Addison–Wesley Publishing Company, p. 592.

"Image Analysis and Mathematical Morphology", vol. 1 by Jean Serra, Academic Press (1982), pp. 424–478.

"Computer and Robot Vision, vol. 1," by Robert M. Haralick and Linda G. Shapiro, Addison–Wesley (1992), pp. 639–658.

* cited by examiner

Primary Examiner—Matthew C. Bella
Assistant Examiner—Sheela Chawan
(74) Attorney, Agent, or Firm—David M. Woods

(57) ABSTRACT

A computer program product for detecting eye color defects of a subject in an image due to flash illumination comprises: a computer readable storage medium having a computer program stored thereon for performing the steps of detecting skin colored regions in a digital image; searching the skin colored regions for groups of pixels with color characteristic of redeye defect; and correcting color of the pixels based on a location of redeye defect found in step (b).

62 Claims, 13 Drawing Sheets

COMPUTER PROGRAM PRODUCT FOR REDEYE DETECTION

FIELD OF THE INVENTION

The invention relates generally to the field of digital image processing and, more particular to a method for detecting redeye in digital images.

BACKGROUND OF THE INVENTION

When flash illumination is used for the capture of an image sometimes the pupils of people in the image appear red. This is caused by light from the flash unit entering the pupil, multiply reflecting off the retina, and finally exiting back through the pupil. Because light is partially absorbed by capillaries in the retina the pupil appears red in the image. This phenomena is referred to as "redeye." The probability of redeye being observed increases the closer the flash unit is to the optical axis of the lens. Therefore, redeye is commonly observed in images captured by a small camera with an integral flash unit.

Commonly assigned U.S. Pat. No. 5,432,863 describes a user-interactive method for the detection of objects in an image that have the color characteristic of redeye. This method automatically detects candidate redeye pixels based on shape coloration and brightness.

Although the presently known method of detecting redeye is satisfactory, it is not without drawbacks. The method of U.S. Pat. No. 5,432,863 does not determine whether the candidate pixels are located in a face or are part of a human eye.

Consequently, a need exists for detecting redeye that overcomes the above-described drawbacks.

SUMMARY OF THE INVENTION

The present invention is directed to overcoming one or more of the problems set forth above. Briefly summarized, according to one aspect of the present invention, the invention resides in a computer program product for detecting eye color defects of a subject in an image due to flash illumination, comprising: a computer readable storage medium having a computer program stored thereon for performing the steps of: (a) detecting skin colored regions in a digital image; (b) searching the skin colored regions for groups of pixels with color characteristic of redeye defect; and (c) correcting color of the pixels based on a location of redeye defect found in step (b).

It is an object of the present invention to provide a method for automatically detecting redeye defects.

It is an object of the present invention to provide a method for determining whether candidate redeye defects are part of the human face.

It is also an object of the present invention to provide a method for determining whether candidate redeye defects are part of the human eye.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

In the following description, the present invention will be described in the preferred embodiment as a software program. Those skilled in the art will readily recognize that the equivalent of such software may also be constructed in hardware.

Figure 1:
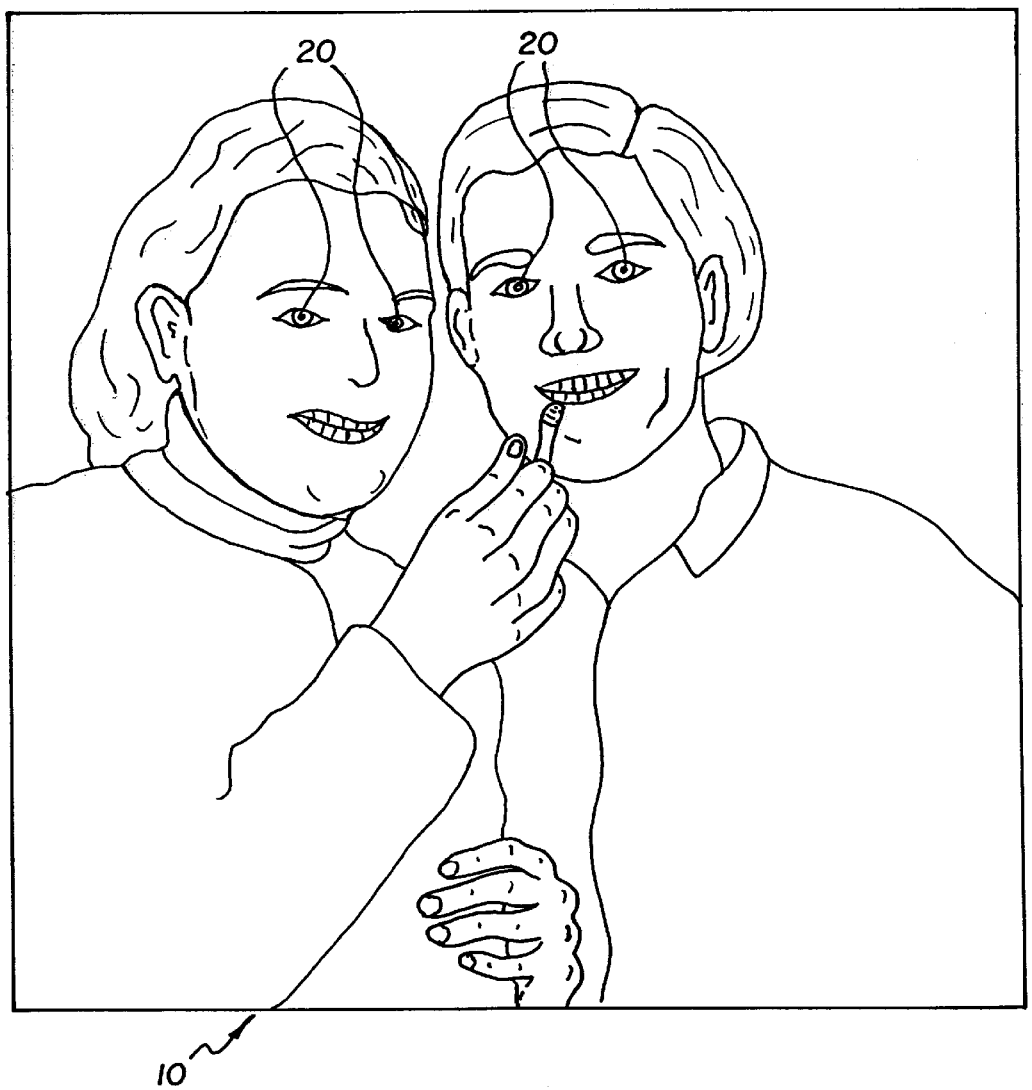
FIG. 1 is a diagram illustrating redeye.

FIG. 1 is a grayscale image 10 of a color image illustrating two pairs of redeyes 20.

Figure 2:
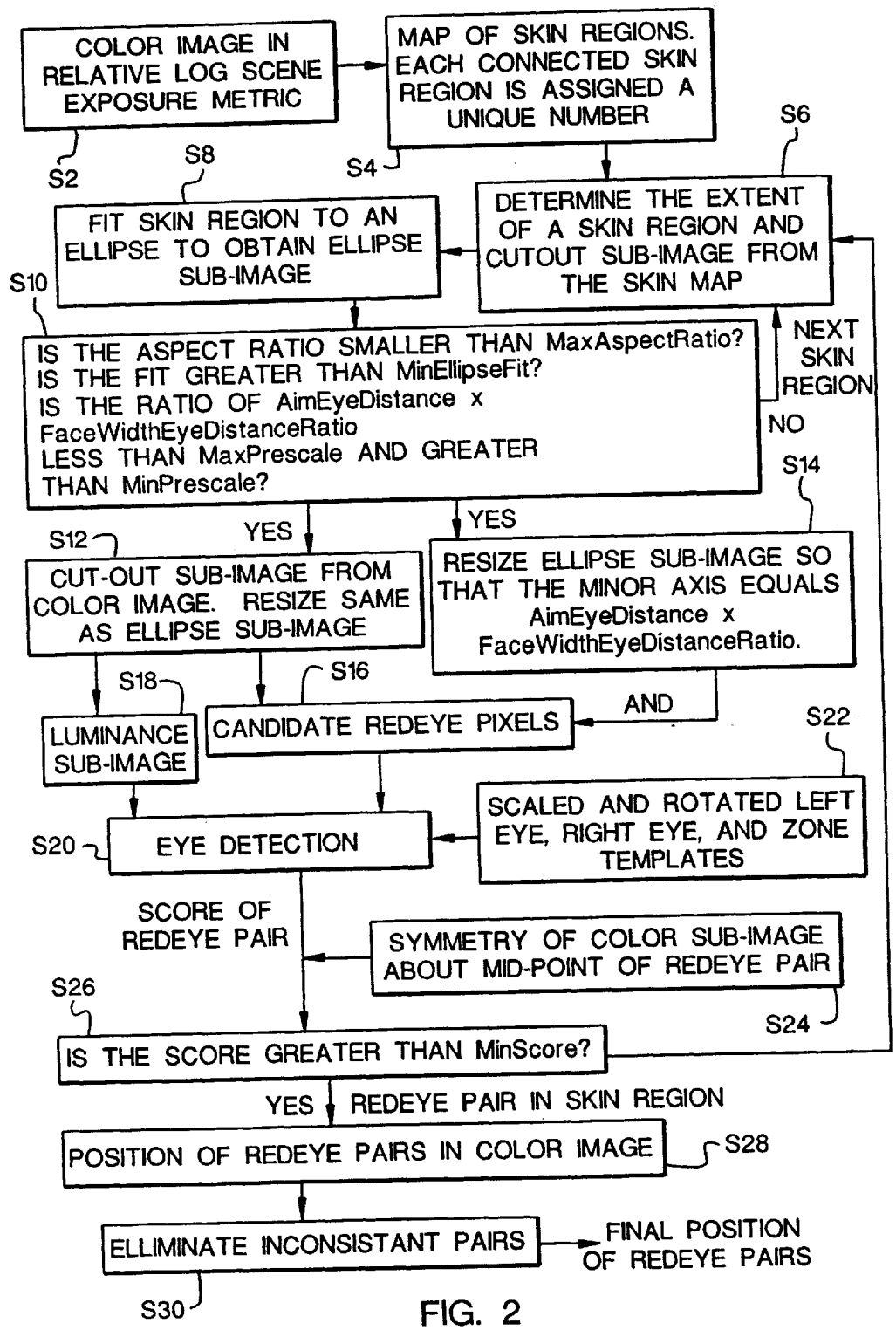
FIG. 2 is an overview flowchart of the software program of the present invention.

Referring to FIG. 2, there is illustrated an overview flowchart of the present invention. A color digital image is input to the software program residing on a computer system, such computer systems being well known in the art. The code values of the digital image are preferably proportional to the log of the amount of exposure of the film used to capture the image by the original scene S2. The program begins by identifying all separate continuous skin colored regions in the image S4.

Figure 3:
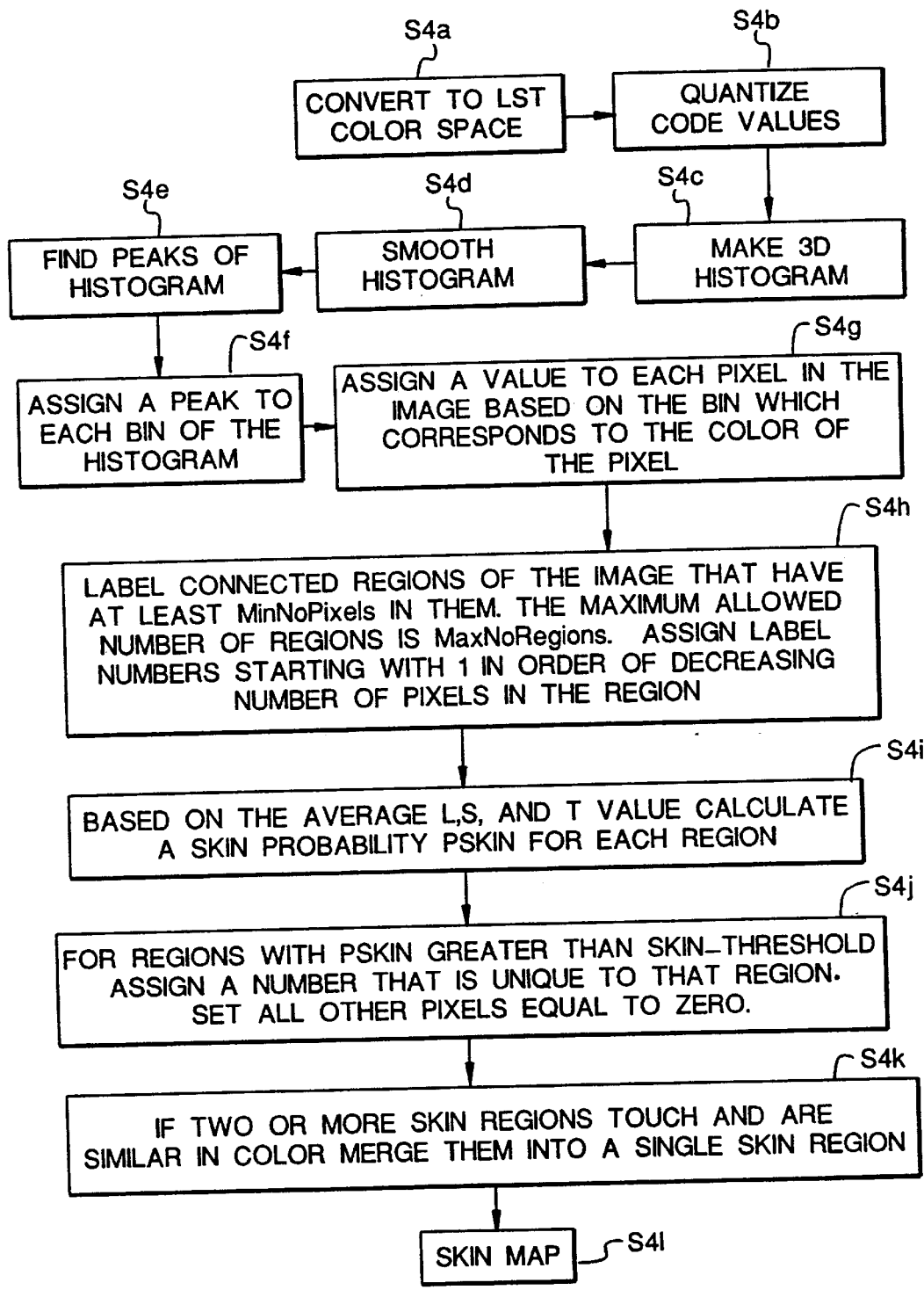
FIG. 3 is a detailed flowchart of the continuous skin colored region determination portion of FIG. 2.

Referring to FIG. 3, there is illustrated a detail flowchart of step S4 in FIG. 2. First, the red, green, and blue values of the color image are converted into LST color space S4a using the relations:

$$L = \frac{1}{\sqrt{3}}(R+G+B)$$

$$S = \frac{1}{\sqrt{2}}(R-B)$$

$$T = \frac{1}{\sqrt{6}}(R+B-2G)$$

where R, G, and B, are the red, green, and blue code value of a pixel in the color image, respectively.

The next step is to build a three-dimensional histogram. In order to reduce the size of the histogram, first, the L, S, and T code values are quantized by dividing them by 8.0×sqrt(3), 2.0, and 2.0, respectively S4b. These quantized code values are referred to as L', S', and T'. Each combination of L', S', and T' values is referred to as a "bin" of the histogram. The value of the histogram H(L', S', T') S4c is equal to the number of pixels in the image that have quantized code values of L', S', and T'. An alternative way of stating this is that the histogram tell us the number of pixels in the image that fall into each bin. This number is referred to as the value of the bin.

The histogram is smoothed S4d by replacing the value of each bin by a weighted average of the value of that bin and the values of immediate neighboring bins. Next, the peak values in the histogram are found S4e and each bin in the histogram is assigned S4f the peak value that is located closest to it. Finally, since each pixel in the color image has been assigned to a bin of the histogram and each bin has been assigned to a peak, a peak is assigned to each pixel in the color image S4g. The single band image in which a pixel's code value is equal to the number of the peak that it was assigned to is referred to as the segmented image.

Continuous regions in the segmented image that have the same code value are likely to correspond to an object or part of an object in the color image. A unique number (label) is assigned to all such regions in the segmented image S4h. The numbers are sequentially assigned starting with 1 for the region with the greatest number of pixels. The single band image in which code values correspond to the label of the region that the pixel belongs to is called the labeled image.

The program then decides which of the continuous regions in the segmented image corresponds to a region in the color image that has a color that is typical of human skin. The average L, S, and T code values of each region is calculated and, based on this, each region is assigned a score $P_{skin}$ S4i. A high value of $P_{skin}$ indicates that the region is of a color that is typical of human skin. Alternatively, a low number indicates that the color of the region is atypical of skin. Regions for which $P_{skin}$ exceeds a threshold $T_{skin}$ of 0.10 are referred to as skin-colored regions S4j.

One final step is necessary to associate each face in the color image with a single skin colored region. The process described above will often result in a single face being associated with more that one skin colored region because due to complexion, shadows, and etc., the color of the face is not uniform. Two skin colored regions are merged into a single skin colored region if two conditions are satisfied S4k. The first condition requires that the two regions be interconnected. A pixel in region i has a connection to region j if a pixel belonging to region j is one of the eight nearest neighbor pixels. A function Q(i, j) is calculated which is proportional to the number of connections between pixels of region i and j. The function is normalized so that Q(i, i) is equal to 1.0. If Q(i, j) exceeds the threshold MinMergerFraction regions i and j will be merged into a single region if the second condition is also satisfied, for example a threshold of 0.005 may be used. The second condition is that the distance between the colors of the regions i and j given by $$D_{color} = ((L_i - L_j)^2 + (S_i - S_j)^2 + (T_i - T_j)^2)^{1/2}$$

must be less than MaxMergeColorDistance which is set equal to 40.0.

The process of merging skin colored regions begins with the smallest region which, if the two conditions are satisfied, is merged with a larger region. If region i is merged with larger region j it may then happen that region j gets merged with an even larger region k. When this occurs regions i, j, and k are merged into a single region. Note that regions i and k may be merged together even though the above two conditions are not satisfied for these two regions. They are merged because of their mutual connection to region j.

Figure 4:
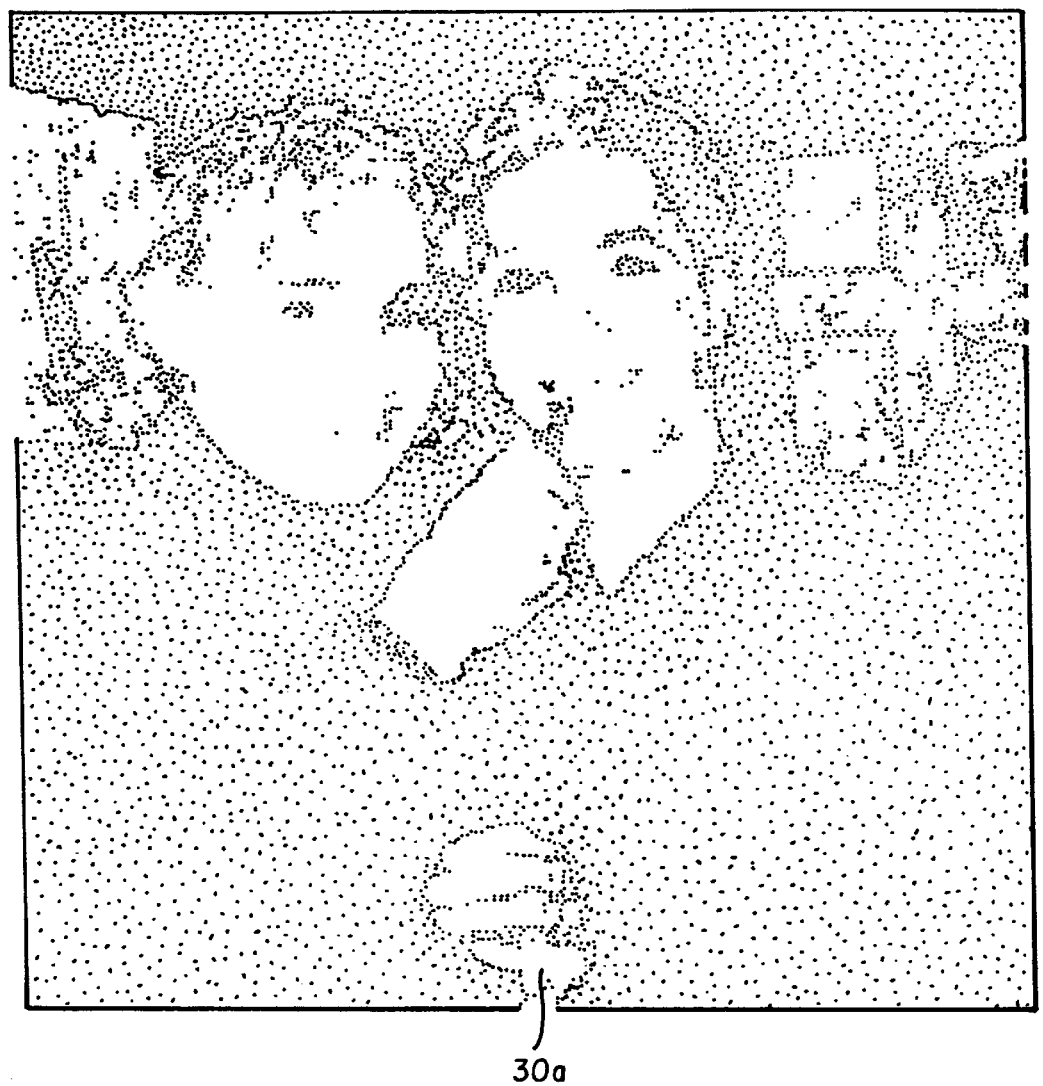
FIG. 4 is a binary representation of FIG. 1 illustrating skin-colored regions.

The result of skin color detection is a map of the skin colored regions in the color image S4l. Areas that are not skin colored are given a code value of zero. The separate continuous skin colored regions are numbered consecutively in order of decreasing region size beginning with the number 1. FIG. 4 shows a map of the skin colored regions in FIG. 1.

Figure 5:
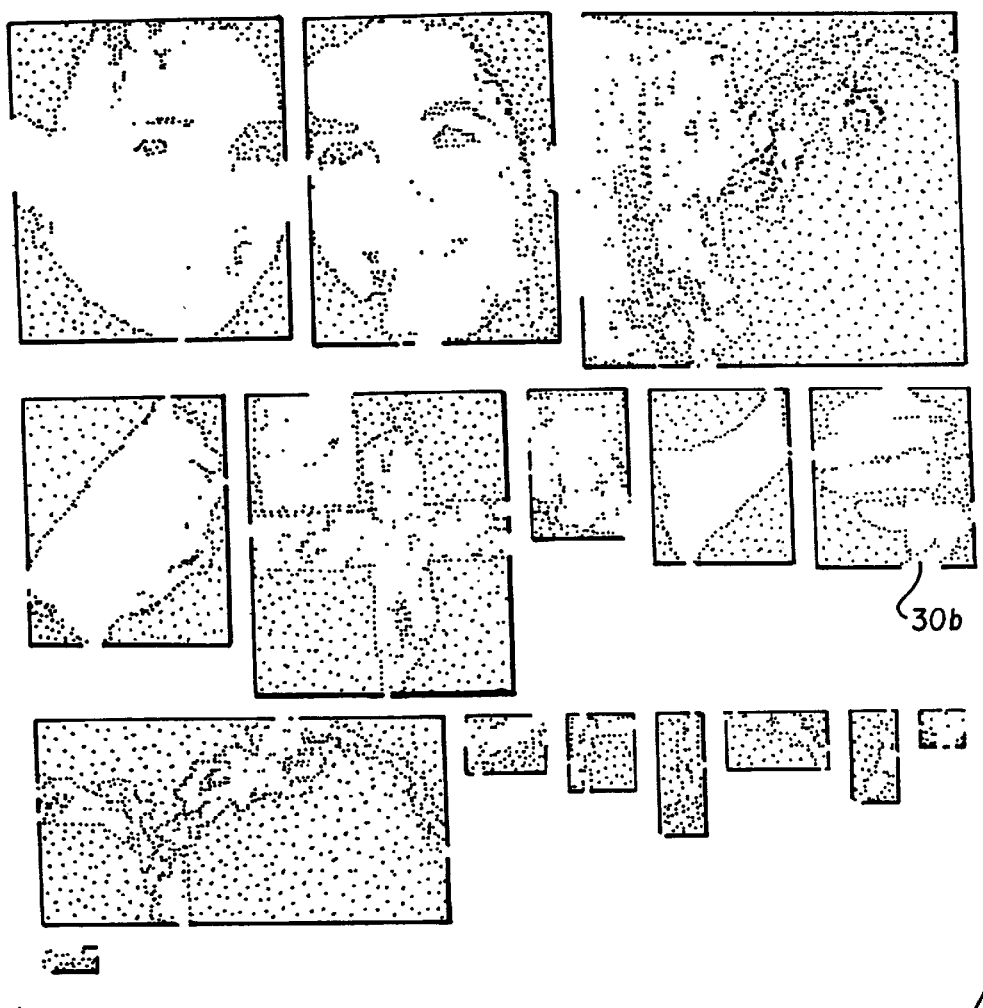
FIG. 5 is a detailed viewed of the individual continues colored regions of FIG. 4.

Referring to FIG. 2, and as illustrated in FIG. 5, a sub-map of each skin colored region is formed by cutting out from the skin map (FIG. 4) the smallest rectangular section that contains all of that skin region S6. For example, skin region 30b in FIG. 5 corresponds to skin region 30a in FIG. 4. FIG. 5 shows the map of each separate continuous skin colored regions as an individual sub-map. The column and row of the skin map that correspond to the top left corner of the sub-map are referred to as $Col_{cutout}$ and $Row_{cutout}$, respectively. In the sub-map code values of 255 (white) indicates that the pixel is located at a position at which skin color is present. A code value of 0 (black) indicates the absence of skin color.

Figure 6:
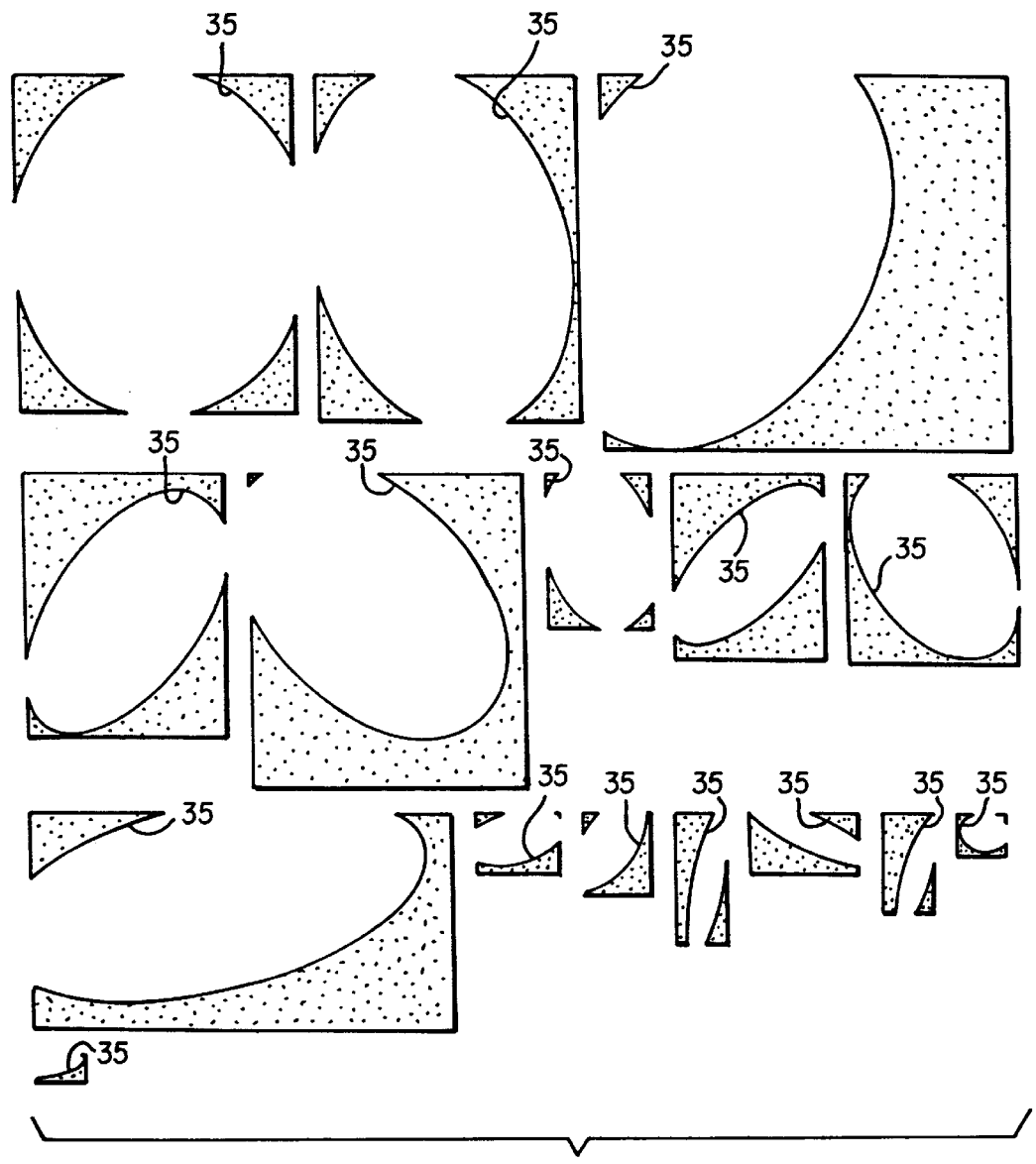
FIG. 6 is a diagram of ellipses fitted to the views of FIG. 5.

Referring to FIG. 2, and as illustrated in FIG. 6, in the next step an ellipse 35 is fitted S8 to the individual skin color sub-maps found in step S6 (FIG. 5). A method of fitting an ellipse to a binary image is described in *Computer and Robot Vision, Volume 1*, by Robert M. Haralick and Linda G. Shapiro, Addison-Wesley (1992), pp. 639–658. A human face is approximately elliptical. Therefore, if the skin color sub-map is of a human face, then the ellipse should fit the skin color map well and the minor axis of the ellipse should approximately equal the width of the face. A measure of the fit of an ellipse to the skin color sub-map is given by $$\text{Fit} = \frac{1}{2}\left(2 - \frac{N_{out}}{N} - \frac{A - N_{in}}{A}\right)$$

where N is the number of skin colored pixels (code value 255) in the map, $N_{out}$ is the number of skin colored pixels that fall outside the ellipse, $N_{in}$ is the number of skin colored pixels that are inside the ellipse, and A is the number of pixels in the ellipse. A is also referred to as the area of the ellipse. If all of the skin colored pixels are in the ellipse and the number of skin colored pixels equals the area of the ellipse then Fit is equal to one and the fit is perfect. When skin colored pixels fall outside of the ellipse or the area of the ellipse is greater than the number of skin colored pixels inside it then the value of Fit is diminished. If the value of Fit is less than a predetermined value MinEllipseFit which is set equal to 0.70 then we conclude that the skin colored region is not a face and we do not process it further S10.

Another indication of whether the skin color sub-map is of a face is the aspect ratio of the ellipse AspectRatio which is given by $$AspectRatio = \frac{D_{major}}{D_{minor}}$$

where $D_{major}$ is the major axis of the ellipse and $D_{minor}$ is the minor axis in pixels. If AspectRatio is greater than MaxAspectRatio which is set equal to 3.0 the skin colored region corresponds to an object in the image that is too long and thin to be a face. The program determines that the skin colored region is not a face and does not process it further S10.

Figure 7:
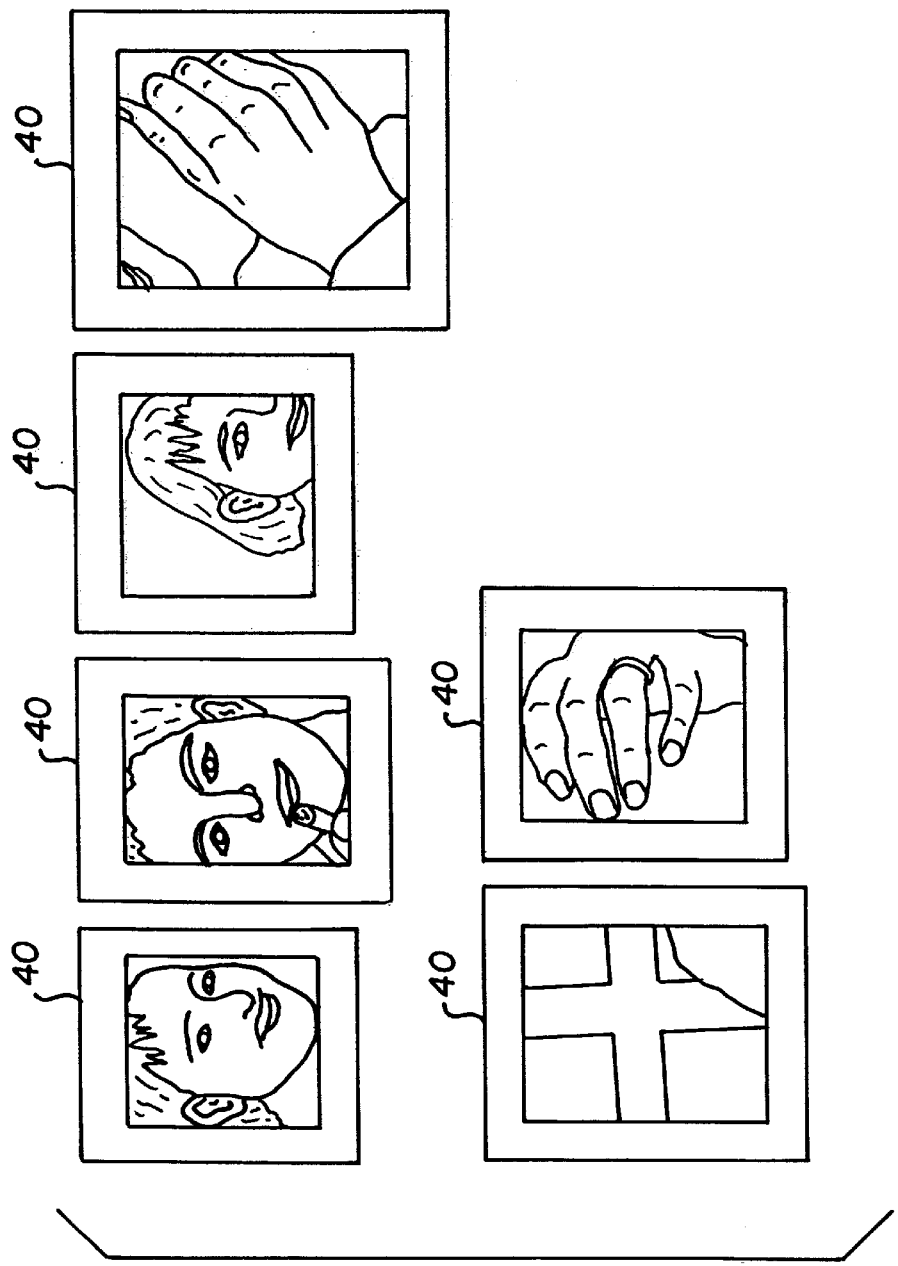
FIG. 7 illustrates resized candidate face regions.
Figure 8:
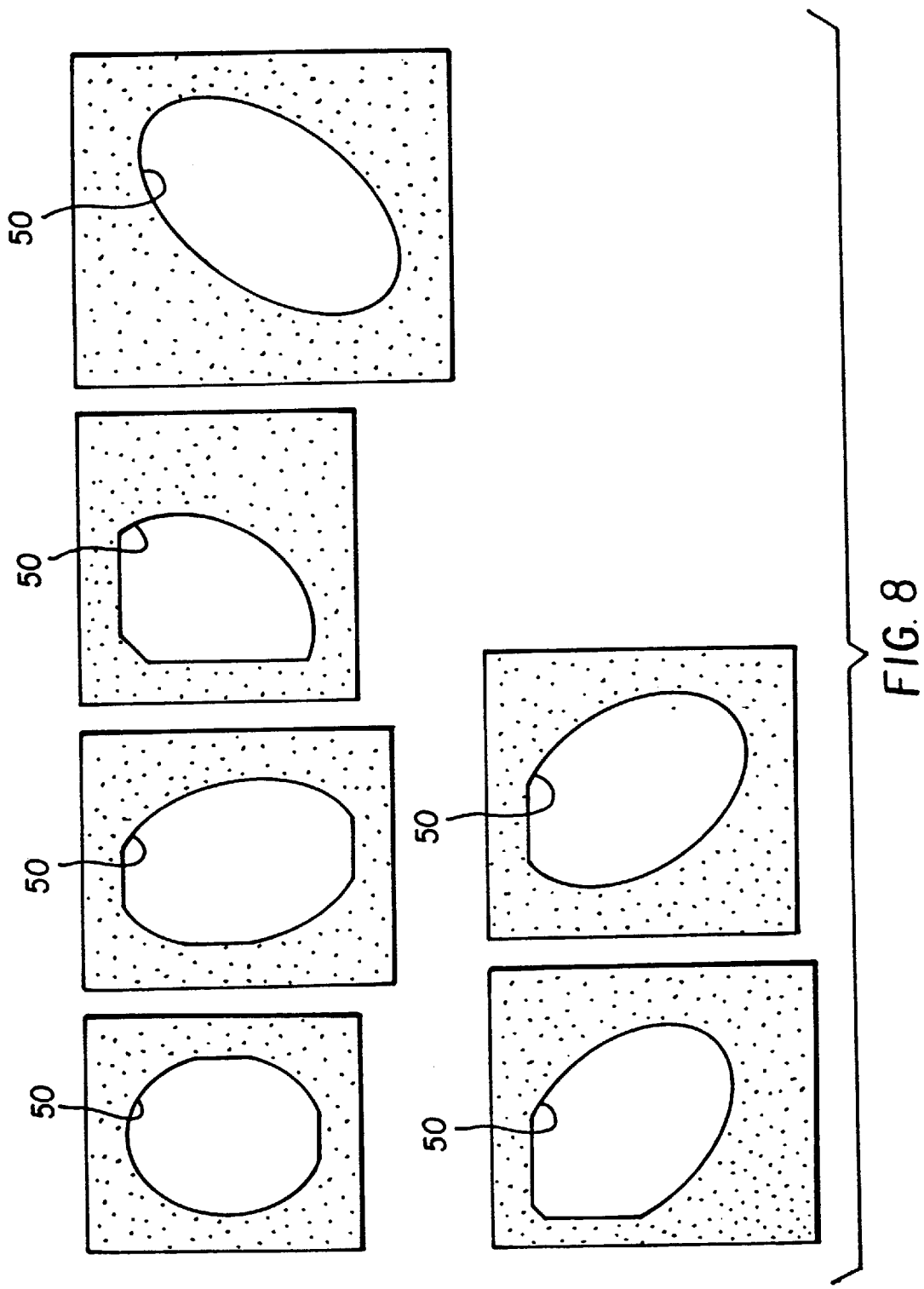
FIG. 8 is a diagram of resized ellipses corresponding to the candidate face regions fitted to FIG. 7.

If the skin sub-map has an acceptable degree of fit to an ellipse and the ellipse has an acceptable aspect ratio, the map potentially indicates the position of a face. Next, we calculate a resize factor $S_{prescale}$ which is given by the following equation $$S_{prescale} = \frac{AimEyeDistance \times FaceWidthEyeDistanceRatio}{D_{minor}}$$

where AimEyeDistance which is set equal to 75 pixels is the desired distance between eyes, and FaceWidthEyeDistanceRatio which is set equal to 2.0 is the ratio between the width and eye distance for a typical face. If $S_{prescale}$ is less than MinPrescale 0.10 or greater than MaxPrescale 1.50 the skin colored region is not processed further S10. The next step is to cut-out from the color image a sub-color-image that corresponds exactly to the location of the sub-map S12. If the minor axis of the ellipse is approximately equal to the width of the face then the distance between the eyes in the face should be close to AimEyeDistance. FIG. 7 shows the sub-color-images 40 after they have been resized in this manner. It is instructive to note that FIG. 7 is illustrated as a gray scale drawing, although the actual image is a color image. FIG. 8 shows the ellipses 50 that correspond to each of these sub-color-images that have also been resized S14. In practice, it is desirable to add extra rows and columns to the edges of the resized sub-color-images and sub-maps so that when these images are processed further an out-of-bounds pixel is not addressed. The top and bottom of the images are padded with Pad rows and the left and right side with Pad columns.

Figure 9:
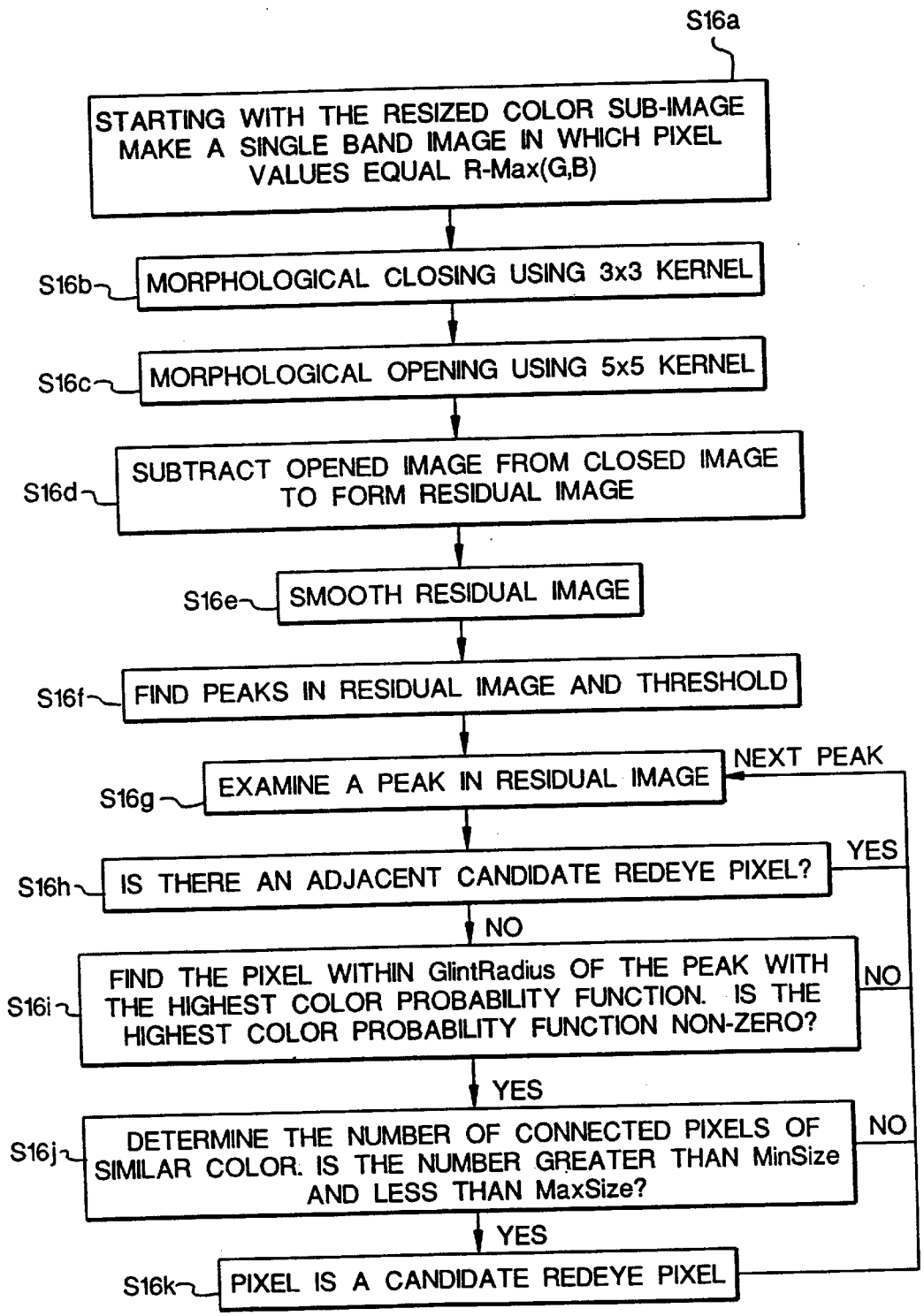
FIG. 9 is a detailed flowchart of the candidate redeye determination portion of FIG. 2.

Now that skin colored regions that have the shape of a face have been identified, the location of candidate redeyes need to be identified S16, which is illustrated in detail in FIG. 9. Now referring to FIG. 9, the sub-color-images 40 are processed so as to identify small red features. The program begins by defining a new single band image S16a with pixel values X given by $$X = R - \text{Max}(G,B)$$

where R, G, and B, are the red, green, and blue code value of the sub-color-image, respectively.

Redeyes in the new image will appear as small elliptical areas of high code value possibly with a small low code value region in the middle that is due to glint in the pupil. The affect of glint is removed by performing a gray scale morphological closing S16b using a W_close x W_close kernel, for example a 3×3 kernal although other sizes may also be used. Gray scale morphological operations are disclosed in *Image Analysis and Mathematical Morphology Volume* 1, by Jean Serra, Academic Press (1982), pp. 424–478. Next, the small regions of high code value are removed by a gray scale morphological opening operation using a W_open×W_open kernel, for example a 5×5 kernal although other sizes may also be used S16c. The opened image is then subtracted from the closed image in order to form a residual image S16d. This image shows what was in the opened image, but not in the closed image. Namely, small regions of high code value which correspond to small red features in the sub-color-image. Next, the residual image is smoothed S16e with a linear filter having the kernel shown below.

```
121
242
121
```

Figures 10, 10A:
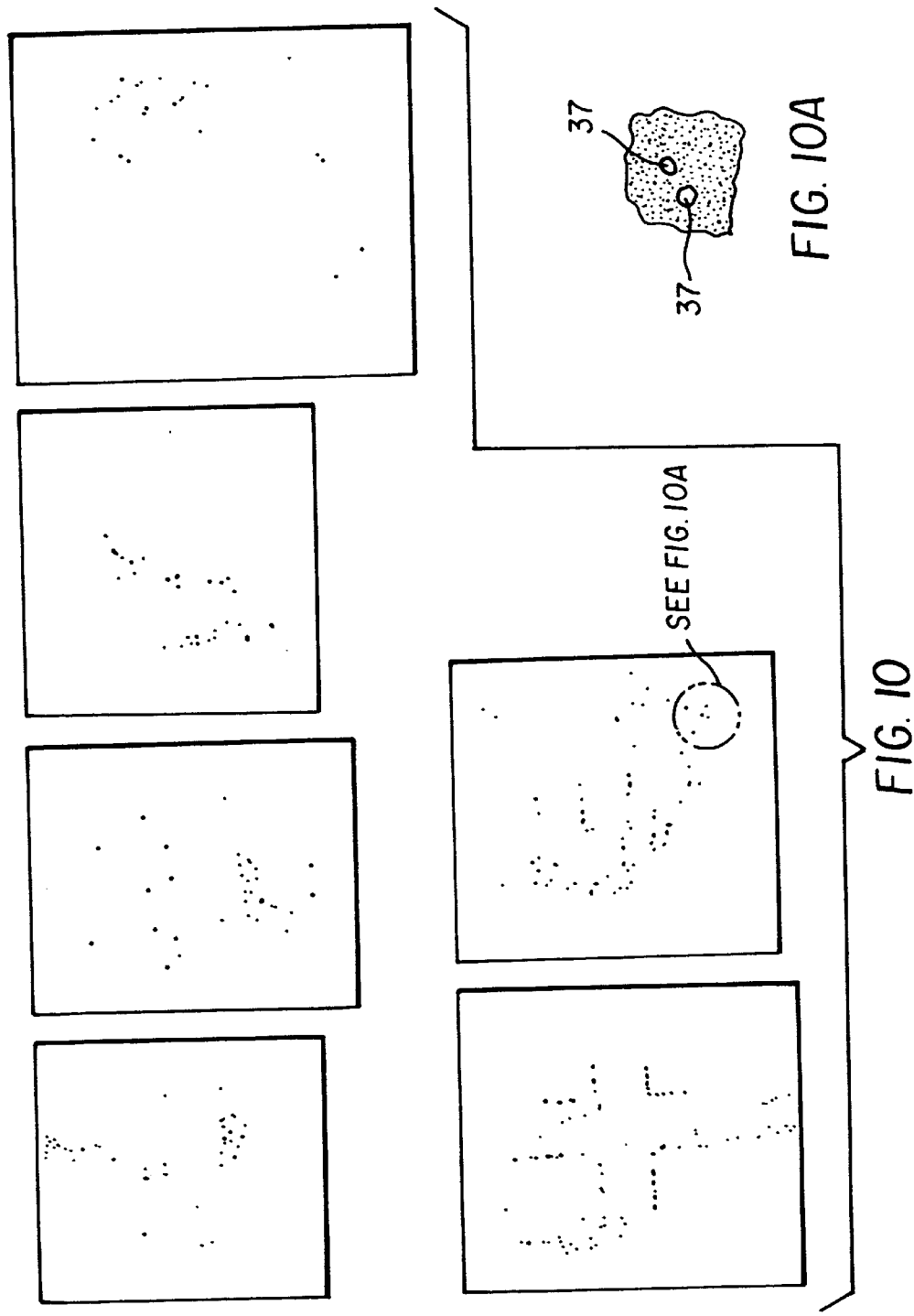
FIG. 10 illustrates the candidate redeye defects of FIG. 7.

For each pixel in the smoothed residual image, a 7×7 window centered at that pixel is examined. If the code value of that pixel exceeds the threshold Tpeak which is set equal to 5 and is greater than or equal to the code value of all the other pixels in the window, that pixel is classified as a peak S16f. FIG. 10 shows the peaks 37 for all of the sub-color-images in FIG. 7. After all the peaks in the smoothed residual image have been found the individual peaks are examined S16g. First, if a pixel has been classified as a peak and a neighboring pixel that is west, north-west, north, or north-east of this pixel has also been classified as a peak, the peak is eliminated S16h.

A pixel that has been classified as a peak is a candidate redeye pixel. It is possible however that the location of the peak coincides with glint in the pupil and not the red defect. For this reason, pixels within a distance GlintRadius equal to 2 from the peak are examined S16i. The candidate redeye pixel is moved to the nearby pixel with the highest color score $P_{color}$ which will be defined below.

Next, the candidate redeye pixel is used as a seed to grow a continuous region of pixels of simular color. If the number of pixels in the region is less than MinSize or greater than MaxSize the region is not of a size that is characteristic of a redeye defect and the candidate redeye pixel is eliminated S16j.

The result of the above processing is a map of candidate redeye pixels for each sub-color-image S16k. The ellipses in FIG. 8 are approximate maps of the region in the corresponding sub-color-images in FIG. 7 that have been identified as potentially being a face. Therefore, only the candidate redeye pixels that fall inside of the ellipse are considered in the next phase eye detection which is outlined in FIG. 11.

Referring back to FIG. 2, the purpose of eye detection is to determine whether the candidate redeye pixels are indeed part of an eye. The eye detection procedure requires a monotone version of the color image S18. The green band of the color image is used after the contrast is increased by transforming the green pixel code values using the equation $$G = 255 \left( \frac{G}{255} \right)^{\gamma}$$

where G is the code value of the green band and γ is a parameter which is set equal to 2.0. This monocolor version of the color image will be referred to as the luminance image.

Figure 12:
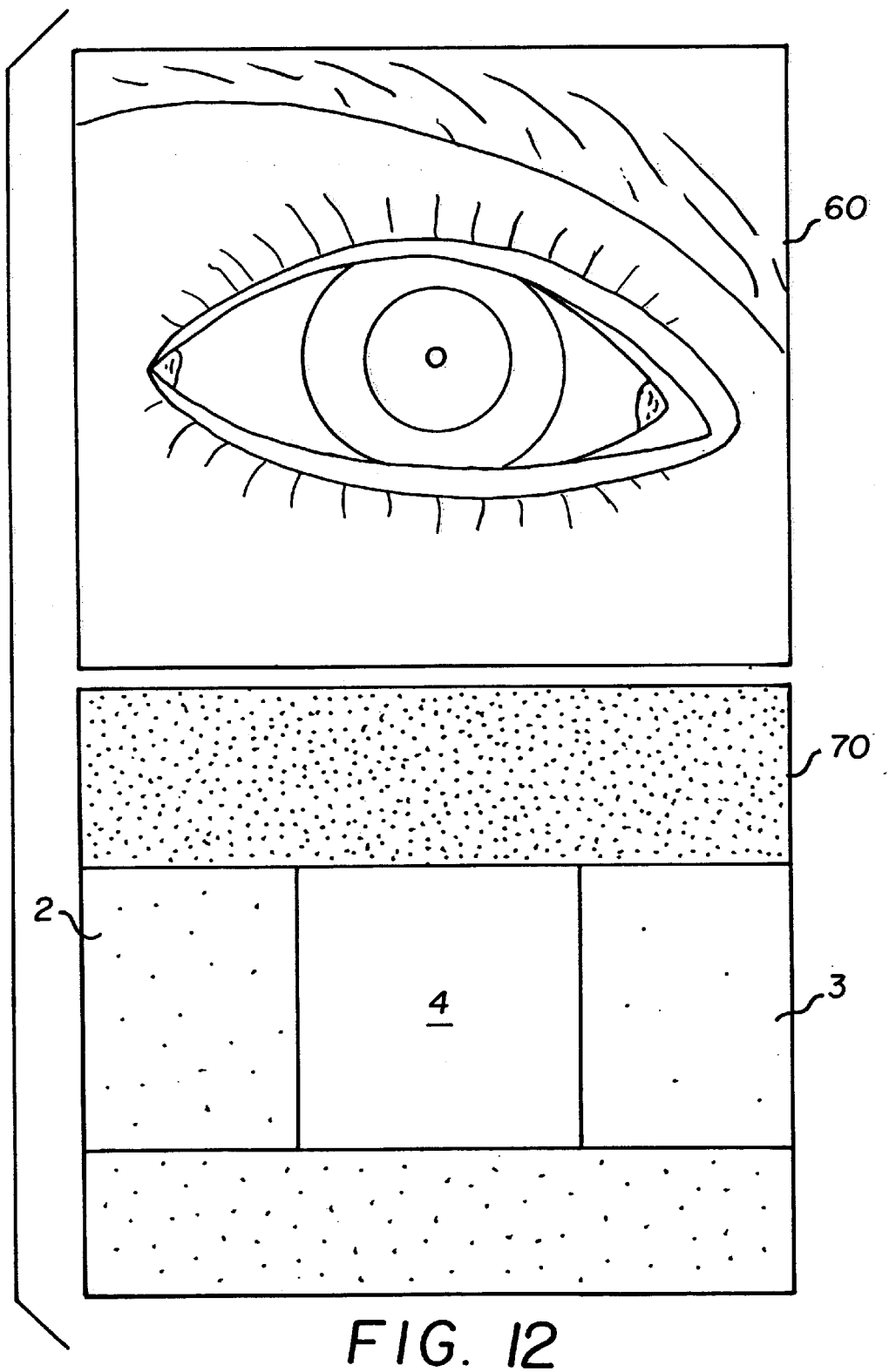
FIG. 12 illustrates an eye template, and zone map.

The eye detection procedure S20 in FIG. 2 is based on the process of template matching. It facilitates understanding to note that any image of an eye can be used a the template. The top image 60 in FIG. 12 shows a left-eye template. The bottom image 70 shows a division of the template into zones. Zone 1 is the eyebrow region. Zones 2 and 3 are the left and right sides of the eye, respectively. Zone 4 includes the pupil and iris. Zone 0 is not used. The eye template was taken from an image in which the distance between the eyes is TemplateEyeDistance equal to 306 pixels and the tilt of the two eyes is close to zero. As discussed above, a pair of redeyes in the resized color sub-images should be approximately a distance AimEyeDistance (75 pixels) apart. Therefore, in order for the template to be of the proper size to match an eye is must be resized by a factor of $$S_0 = \frac{AimEyeDistance}{TemplateEyeDistance}$$

In practice, the estimation of the face width from the minor axis of the ellipse will not always be accurate. Also, the eyes may be tilted. For this reason starting with the original left-eye template and the zone map, a collection of left-eye, right-eye (mirror image of left-eye), and zone maps are generated that span a range of sizes and orientations S22. The original eye template and zone map are resized from a factor of $S_0 \times$Narrow to $S_0 \times$Wide in increments of SStep. Preferred values of Narrow, Wide, and Sstep are 1.5, 0.50, and 0.05, respectively. In order to accommodate tilt for each resize factor, a series of tilted templates and zone maps are generated that range from −MaxTilt degrees (clock-wise tilt) to MaxTilt degrees in increments of TStep degrees S22. The preferred value of MaxTilt is 30 degrees and of TStep is 2.0 degrees.

Figure 11:
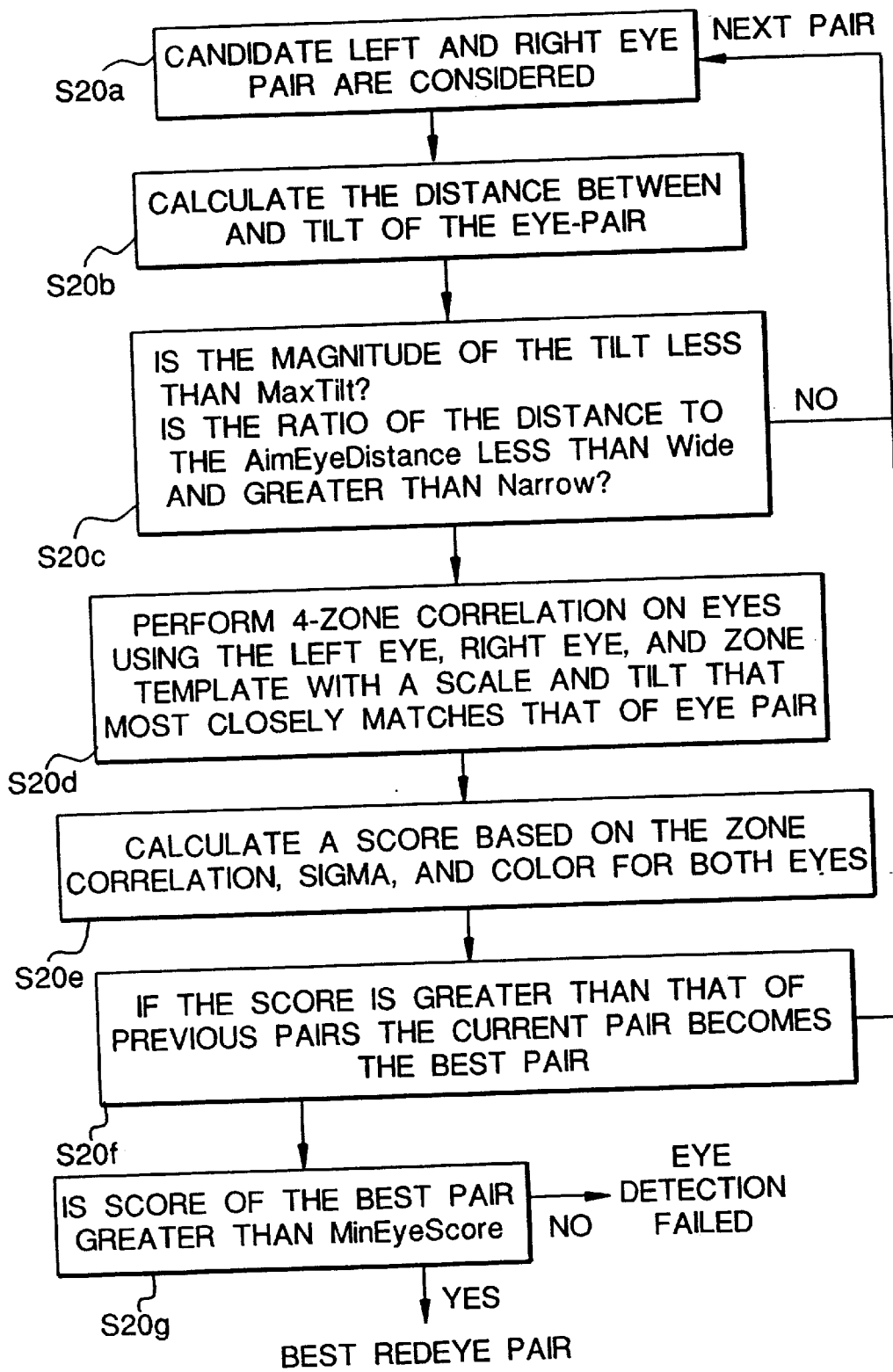
FIG. 11 is a detailed flowchart of the eye detection portion of FIG. 2.

Referring to FIG. 11, a detailed flowchart of step S20 of FIG. 2 is shown. A pair of candidate redeye pixels are considered that hypothetically belong to a left and right redeye pair S20a. The scale of the eye relative to the original eye template is related to the distance S20b between the candidate redeye pixel pair by the equation $$S_{pair} = \frac{((L_p - R_p)^2 + (L_l - R_l)^2)^{1/2}}{TemplateEyeDistance}$$

where $L_p$ ($R_p$) is the column of the left (right) candidate redeye pixel, $L_l$ ($R_l$) is the row of the left (right) candidate redeye pixel. (The column numbers begin with 1 and increase from left to right. The row numbers begin with 1 and increase from top to bottom.) The tilt S20b between the candidate redeye pixels is given by $$\text{Tilt} = \tan^{-1}\left(\frac{L_l - R_l}{R_p - L_p}\right)$$

As discussed above, an ensemble of eye templates and zone map templates were made that span a range of resize factors from $S_0 \times$Narrow to $S_0 \times$Wide with resolution SStep and with a tilt from −MaxTilt degrees to MaxTilt degrees with a resolution TStep. The left-eye template, right-eye template, and zone map that most closely match the value of $S_{pair}$ and Tilt for the pair of candidate redeye pixels is used in the correlation step that follows. If $S_{pair}$ or Tilt are outside of this range, this pair is not processed further S20c.

After an eye template has been selected the next step is to determine if the region around the redeye pixel matches an eye. This is done by performing a correlation of the left-eye template with a region around the left candidate redeye pixel and the right-eye template with a region around the right candidate redeye pixel of the luminance image S20d. One step of the correlation process is to match up pixels of the template and luminance image and calculate the product of their code values. The center of the template images corresponds to the center of the eye. Since the candidate redeye pixels are close, but not necessarily at the center of an eye, we perform the correlation several times with the center of the template matched to all of the pixels within a square that extends a distance LookAround equal to 3 about the candidate redeye pixel. The correlation is performed separately for zones 1 through 4 of the template (see FIG. 12). These correlations are referred to as Cz1, Cz2, Cz3, and Cz4. In addition, an overall correlation is calculated for a region that consists of the sum of zones 1 through 4. This overall correlation is referred to as C. The pixel in the square around the candidate redeye pixel with the highest value of the overall correlation C is the best guess of the center of an eye which contains the candidate redeye pixel. This pixel is referred to as the eye-center pixel. Both the left and right candidate redeye pixels have an associated eye-center pixel.

The correlation process is now explained in detail. The template image is denoted by the function $\Phi(p,l)$ where p is the column number and l is the row number. The number of columns and rows in the template is w and h, respectively. The center of the eye template is approximately the location of the center of the eye. A zone of the template is correlated with the luminance image which we denote by $\Gamma(p,l)$ at column $p_o$ and row $l_o$ by calculating the product $\Pi$ given by.

$$\Pi = \frac{1}{N_z} \sum_{p \in Z} \sum_{l \in Z} \Gamma(p + p_o - w/2 - 1, l + l_o - h/2 - 1) \Phi(p, l)$$

where $p \in Z$ means that column p is in zone Z, $l \in Z$ means that row l is in zone Z, and $N_z$ is the number of pixels in the zone. The mean code value of the template in zone Z given by $$M_\Phi = \frac{1}{N_z} \sum_{p \in Z} \sum_{l \in Z} \Phi(p, l)$$

is also calculated. In addition, the standard deviation of the template in zone Z is calculated according to the equation.

$$\sigma_\Phi = \left(\frac{1}{N_z} \sum_{p \in Z} \sum_{l \in Z} (\Phi(p, l) - M_\Phi)^2\right)^{1/2}$$

Similarly, we calculate the mean code value of the luminance image in zone Z using the equation $$M_\Gamma = \frac{1}{N_z} \sum_{p \in Z} \sum_{l \in Z} \Gamma(p + p_o - w/2 - 1, l + l_o - h/2 - 1)$$

and the standard deviation using the following equation $$\sigma_\Gamma = \left(\frac{1}{N_z} \sum_{p \in Z} \sum_{l \in Z} (\Gamma(p + p_o - w/2 - 1, l + l_o - h/2 - 1) - M_\Gamma)^2\right)^{1/2}$$

Using the quantities defined above the correlation of the luminance image with the template in zone Z is given by the relation $$C_z = \frac{\Pi - M_\Phi M_\Gamma}{\sigma_\Phi \sigma_\Gamma}$$

If the code values of the image and the template are exactly the same in zone Z then $C_Z$ is equal to 1.0. If the image and the template are completely uncorrelated then $C_Z$ will be equal to zero.

Figure 13:
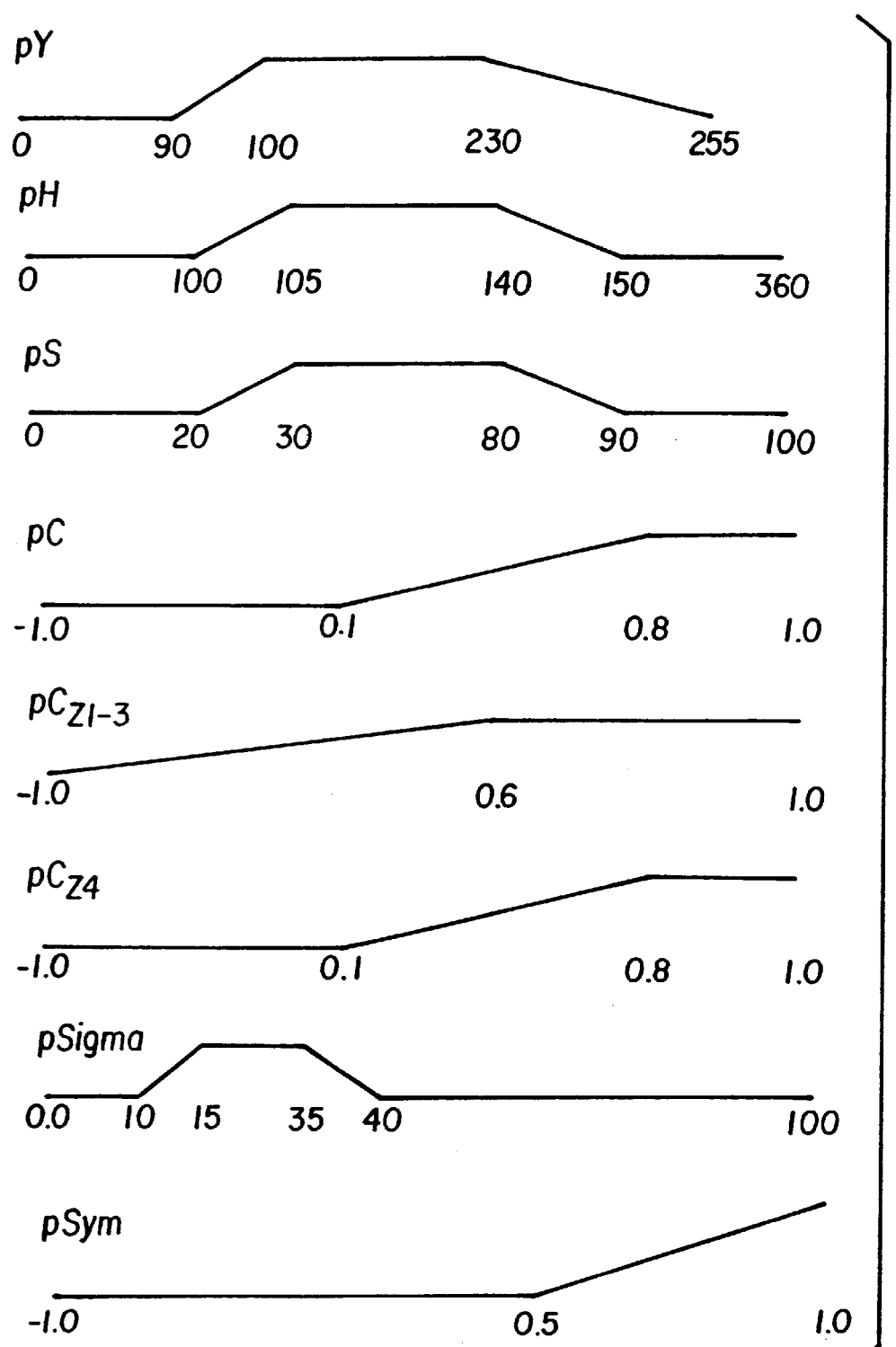
FIG. 13 illustrates scoring functions of the present invention.

The values of C, $C_{Z1}$, $C_{Z2}$, $C_{Z3}$, and $C_{Z4}$ for the eye-center pixels are used in the calculation of a score that is a measure of the likelihood that the pair of candidate redeye pixels are part of a redeye defect in the sub-color-image S20e. Each of the correlations are used as a variable in an associated scoring function that ranges from 0.0 to 1.0. For example, the scoring function associated with the overall correlation C which we refer to as pC(C) is 0.0 if the value of C for an eye-center pixel indicates that it is very unlikely that the pixel actually is located at the center of an eye. On the other hand, if the value of C is in a range that is typical of the correlation of the template with an eye then pC(C) is 1.0. Otherwise pC(C) takes on an intermediate value. The scoring function pC(C) and other scoring functions described below are shown in FIG. 13.

Scores are defined based on these scoring functions which will be combined later into an overall score for a candidate redeye pair. The following equation defines a score $P_{corr}$ related to the overall correlation C as simply $$P_{corr} = pC(C)$$

The score $P_{zone}$ associated with the zone correlations is a weighted average of the zone correlation scoring functions. It has been found that the correlation in zone 4 (the pupil) is a much more reliable indicator of the presence of an eye than the other zones. For this reason it is given more weight than other zones. Typical we set the weight W equal to 6.0. $P_{zone}$ is given by $$P_{zone} = \frac{pC_{z1}(C_{z1}) + pC_{z2}(C_{z2}) + pC_{z3}(C_{z3}) + WpC_{z4}(C_{z4})}{W+3}$$

It has been found that the standard deviation of the luminance image $\sigma_\Gamma$ that was calculated in the process of calculating the overall correlation C is a good indicator if the feature in the luminance image centered at the eye-center pixel is actually an eye. For instance, if $\sigma_\Gamma$ is very low than the feature is of too low contrast to be an eye. With this in mind we define a score associated with $\sigma_\Gamma$ by $$P_{sigma} = pSigma(\sigma_\Gamma)$$

Finally, the color of the candidate redeye pixel must be indicative of a real redeye defect. For this calculation the red, green, and blue, code values of the candidate redeye pixel is convert into luminance (Lum), hue (Hue), and saturation (Sat) values. Luminance is calculated as follows $$Lum = \frac{Max(R, G, B) + Min(R, G, B)}{2}$$

The value of Lum for a pixel ranges from zero to the highest possible code value. The saturation given by $$Sat = 100 \frac{Max(R, G, B) - Min(R, G, B)}{Max(R, G, B)}$$

is a value ranging from 0 to 100. The hue is defined as in *Computer Graphics Principles and Practice 2nd ed.*, Addison-Wesley Publishing Company, page 592, except the color red is shifted to a hue angle of 120 degrees. The value of Hue may range from 0 to 360 degrees. The score that is related to the color of the candidate redeye pixel is defined by $$P_{color} = pL(Lum)pH(Hue)pS(Sat)$$

The result is a score $P_{eye}$ which indicates the likelihood that a candidate redeye pixel is actually part of a redeye defect in the image. This score is defined by $$P_{eye} = P_{corr} P_{zone} P_{sigma} P_{color}$$

Its value is in the range of 0.0 to 1.0. The figure of merit $P_{eye}$ is calculated for both the left and the right candidate redeye pixels in a pair. The average of these two values is given by $$P_{pair} = \frac{P_{eye}^{Left} + P_{eye}^{Right}}{2}$$

The pair of candidate redeye pixels for which $P_{pair}$ is the largest is referred to as the best pair of candidate redeye pixels S20f. If $P_{pair}$ exceeds the threshold MinEyeScore equal to 0.05, then the program processes further. Otherwise, the program concludes that a pair of redeyes is not present in the sub-color-image S20g.

It is important to minimize the possibility that the best pair of candidate redeye pixels that are not part of a pair of eyes with a redeye defect in the color image be incorrectly classified. One method of confirming that a pair of redeyes has indeed been located is to use the fact that a human face is approximately symmetric about a line that bisects the face S24 in FIG. 2. In order to do this, the sub-color-image is rotated so that the tilt of a line connecting the best pair of candidate redeye pixels is equal to zero. Next, an image centered at the midpoint between the eyes is cut-out of the sub-color-image. This image has a width of 1.5 times the distance between the candidate redeye pixels and a height equal to a quarter of its width. This image is in turn cut in half. The left half-image we refer to as $E^x\text{left}(p,l)$ and the right half-image by $E^x\text{right}(p,l)$ where the superscript x refers to a band of the color image. For example, $E^r\text{left}(p,l)$ refers to the red band of the image. The columns in the right half-image are inverted (the first column becomes the last column, etc.) so that it becomes a mirror image of itself. A correlation of $E^x\text{left}(p,l)$ and $E^x\text{right}(p,l)$ is performed by first calculating the sum of products $$\Pi_{sym}^x = \frac{1}{N} \sum_p \sum_l E^x\text{left}(p, l)E^x\text{right}(p, l)$$

where the summations over p and l are over all of the columns and rows in the half-images, respectively, and N is the number of pixels in the half-images. The correlation is given by $$C_{sym}^x = \frac{\Pi_{sym}^x - M_{left}^x M_{right}^x}{\sigma_{left}^x \sigma_{right}^x}$$

where $M^x\text{left}$ and $M^x\text{right}$ are the mean code values of band x of the half-images and $\sigma^x\text{left}$ and $\sigma^x\text{right}$ are the standard deviations. A score $P_{sym}$ is defined based on a symmetry scoring function $pSym(C_{sym}^x)$ by $$P_{sym} = pSym(C^r sym)pSym(C^g sym)pSym(C^b sym)$$

The final score P is simply the product of $P_{sym}$ and $P_{pair}$.

$$P = P_{sym} P_{pair}$$

If this score which may range between 0.0 and 1.0 exceeds a threshold MinScore which is set equal to 0.05 S26, then the candidate redeye pixel pair is assumed to mark the location of a pair of redeye defects in the resized sub-color-image.

Finally, the positions of the left and right redeye defects in the original color image are calculated based on the position of the left and right candidate redeye pixels in the resized sub-color-image using the relations $$p' = \frac{p - Pad}{S_{prescale}} + Col_{cutout} - 1$$

$$l' = \frac{l - Pad}{S_{prescale}} + Row_{cutout} - 1$$

where p and l are the column and row of the left candidate redeye pixel in the resized sub-color-image and p' and l' are the corresponding positions in the original color image S28.

It sometimes happens that two different skin colored regions after being fitted to an ellipse will overlap or be very close together. This may result in the same redeye pair being found twice or the detection of two redeye pairs that are too close together for both to be truly a pair of redeyes. For this reason, after all the redeye pairs in the color image have been located it is determined if any two pairs have redeye locations less than MinInterpairEyeDistance equal to 20 pixels apart. If this is the case the pair with the lower score is eliminated S30.

We claim:

1. A computer program product for detecting eye color defects of a subject in an image due to flash illumination, comprising:

a computer readable storage medium having a Computer program stored thereon for performing the steps of:
  (a) searching an entire digital image for detecting one or more skin colored regions in the digital image that have a characteristic of a face;
  (b) resizing each skin colored region based on one or more predetermined facial dimensions to form one or more resized skin colored regions;
  (c) searching the resized skin colored regions for groups of pixels with color characteristic of redeye defect; and
  (d) correcting color of the pixels based on a location of redeye defect found in step (c).

2. The computer program product as in claim 1, wherein step (a) includes:
  (a1) segmenting the digital image into continuous regions of uniform color and assigning a score indicating probability that the region corresponds to skin for forming a candidate skin region.

3. The computer program product as in claim 2, wherein step (a1) includes merging two or more candidate skin regions based on their similarity of color and degree of connectivity.

4. The computer program product as in claim 2, wherein step (a1) includes determining probability that the candidate region is a face based on its shape.

5. A computer program product for detecting eye color defects of a subject in an image due to flash illumination, comprising:

a computer readable storage medium having a computer program stored thereon for performing the steps of:
  (a) searching of an entire digital image for skin-colored regions having groups of pixels with color characteristic of redeye defect for forming candidate redeye defect, said skin colored regions having a characteristic of a face;
  (b) evaluating the groups of pixels relative to one or more properties of a face to determine whether a pair of the candidate redeye defects is consistent with the size expected of an eye based on distance between the pair of candidate redeye defects; and
  (c) correcting color of the pixels based on a location of redeye defect found in step (b).

6. The computer program product as in claim 5, wherein the match of step (b) further includes determining for a pair of candidate redeye defects the tilt expected of an eye based on the tilt of the pair of candidate redeye defects.

7. The computer program product as in claim 5, wherein the match of step (b) includes correlating a region around the candidate redeye defects with an eye template.

8. The computer program product as in claim 7, wherein the match of step (b) includes correlating the region around the candidate redeye defects with individual zones of the eye template.

9. A computer program product for detecting eye color defects of a subject in an image due to flash illumination, comprising:

a computer readable storage medium having a computer program stored thereon for performing the steps of:
  (a) detecting skin colored regions in a digital image;
  (b) resizing each skin colored region based on one or more predetermined facial dimensions to form one or more resized skin colored regions;
  (c) searching the resized skin colored regions for groups of pixels with color characteristic of redeye defect for forming a candidate redeye defect;
  (d) evaluating the groups of pixels relative to one or more properties of a face to determine whether a pair of the candidate redeye defects is consistent with a facial property of an eye pair; and
  (e) correcting color of the pixels based on a location of the redeye defect.

10. The computer program product as in claim 9, wherein step (a) includes: (a1) segmenting the digital image into continuous regions of uniform color and assigning a score indicating probability that the region corresponds to skin for forming a candidate skin region.

11. The computer program product as in claim 9, wherein step (a1) includes merging two or more candidate skin regions based on their similarity of color and degree of connectivity.

12. The computer program product as in claim 10, wherein step (a1) includes determining probability that the candidate region is a face based on its shape.

13. The computer program product as in claim 9, wherein the match of step (d) further includes determining for a pair of candidate redeye defects the size and tilt expected of an eye based on distance between and the tilt of the pair of candidate redeye defects.

14. The computer program product as in claim 13, wherein the match of step (d) includes correlating the region around the candidate redeye defects with individual zones of the eye template.

15. The computer program product as claimed in claim 1 wherein resizing in step (b) is based on a predetermined distance between the eyes of a typical face.

16. The computer program product as claimed in claim 15 wherein resizing in step (b) is based on a predetermined ratio between the width of a typical face and the distance between the eyes of a typical face.

17. The computer program product as claimed in claim 1 wherein step (c) further comprises comparing each redeye defect to one or more facial properties of the resized skin colored regions.

18. The computer program product as claimed in claim 17 wherein each redeye defect is compared to an eye size expected for the resized skin colored region.

19. The computer program product as claimed in claim 1 wherein step (c) further comprises detecting pairs of redeye defects by comparing each redeye defect in the pair to one or more facial properties of the resized skin colored regions.

20. The computer program product as claimed in claim 19 wherein the distance between each redeye defect in a pair is compared to a distance expected for the resized skin colored region.

21. The computer program product as claimed in claim 19 wherein each redeye defect in the pair is compared to an eye size expected for the resized skin colored region.

22. A computer program product for detecting eye color defects of a subject in an image due to flash illumination, comprising:

a computer readable storage medium having a computer program stored thereon for performing the steps of:
  (a) searching of an entire digital image for skin-colored regions having groups of pixels with color characteristic of redeye defect for forming candidate redeye defect, said skin colored regions having a characteristic of a face;

(b) evaluating the groups of pixels relative to the determined size of a face to determine the extent to which the size of a candidate redeye defect matches an expected size of an eye pupil; and (c) correcting color of the pixels based on the evaluation of redeye defect performed in step (b).

23. The computer program product as in claim 22, wherein the evaluation of step (b) includes correlating a region around the candidate redeye defects with an eye template.

24. A computer program product for detecting eye color defects of a subject in an image due to flash illumination, comprising:

a computer readable storage medium having a computer program stored thereon for performing the steps of:

(a) searching of an entire digital image for skin-colored regions having groups of pixels with color characteristic of redeye defect for forming candidate redeye defect, said skin colored regions having a characteristic of a face;

(b) evaluating the groups of pixels relative to the size of a face to determine the extent to which the distance between a pair of the candidate redeye defects matches an expected distance between a pair of eyes; and (c) correcting color of the pixels based on a location of redeye defect found in step (b).

25. The computer program product as in claim 24, wherein the evaluation of step (b) includes correlating a region around the candidate redeye defects with an eye template.

26. A computer program product for detecting eye color defects of a subject in an image due to flash illumination, comprising:

a computer readable storage medium having a computer program stored thereon for performing the steps of:

(a) detecting groups of pixels with color characteristic of redeye defect for forming a pair of candidate redeye defects;

(b) evaluating the groups of pixels relative to a distance between the redeye defects and a tilt of the redeye defects to determine the extent to which each candidate redeye defect is part of an eye; and (c) correcting color of the pixels based on the evaluation of redeye defect found in step (b).

27. The computer program product as in claim 26, wherein the evaluation of step (b) includes correlating a region around the candidate redeye defects with an eye template.

28. A computer program product for detecting eye color defects of a subject in an image due to flash illumination, comprising:

a computer readable storage medium having a computer program stored thereon for performing the steps of:

(a) searching of an entire digital image for skin-colored regions having groups of pixels with color characteristic of redeye defect for forming candidate redeye defect, said skin colored regions having a characteristic of a face;

(b) evaluating the groups of pixels relative to one or more properties of a face to determine whether a pair of the candidate redeye defects is consistent with the tilt expected of an eye based on the tilt of the pair of candidate redeye defects; and (c) correcting color of the pixels based on a location of redeye defect found in step (b).

29. The computer program product as in claim 28, wherein the match of step (b) further includes determining for a pair of candidate redeye defects the size expected of an eye based on distance between the pair of candidate redeye defects.

30. The computer program product as in claim 28, wherein the match of step (b) includes correlating a region around the candidate redeye defects with an eye template.

31. The computer program product as in claim 30, wherein the match of step (b) includes correlating the region around the candidate redeye defects with individual zones of the eye template.

32. A method for detecting eye color defects of a subject in an image due to flash illumination, said method comprising the steps of:

(a) searching an entire digital image for detecting one or more skin colored regions in the digital image that have a characteristic of a face;

(b) resizing each skin colored region based on one or more predetermined facial dimensions to form one or more resized skin colored regions;

(c) searching the resized skin colored regions for groups of pixels with color characteristic of redeye defect; and (d) correcting color of the pixels based on a location of redeye defect found in step (c).

33. The method as in claim 32, wherein step (a) includes: (a1) segmenting the digital image into continuous regions of uniform color and assigning a score indicating probability that the region corresponds to skin for forming a candidate skin region.

34. The method as in claim 33, wherein step (a1) includes merging two or more candidate skin regions based on their similarity of color and degree of connectivity.

35. The method of claim 33, wherein step (a1) includes determining probability that the candidate region is a face based on its shape.

36. A method for detecting eye color defects of a subject in an image due to flash illumination, said method comprising the steps of:

(a) searching of an entire digital image for skin-colored regions having groups of pixels with color characteristic of redeye defect for forming candidate redeye defect, said skin colored regions having a characteristic of a face;

(b) evaluating the groups of pixels relative to one or more properties of a face to determine whether a pair of the candidate redeye defects is consistent with the size expected of an eye based on distance between the pair of candidate redeye defects; and (c) correcting color of pixels based on a location of redeye defect found in step (b).

37. The method as in claim 36, wherein the match of step (b) further includes determining for a pair of candidate redeye defects the tilt expected of an eye based on distance between and the tilt of the pair of candidate redeye defects.

38. The method as in claim 36, wherein the match of step (b) includes correlating a region around the candidate redeye defects with an eye template.

39. The method as in claim 38, wherein the match of step (b) includes correlating the region around the candidate redeye defects with individual zones of the eye template.

40. A method for detecting eye color defects of a subject in an image due to flash illumination, said method comprising the steps of:

(a) detecting skin colored regions in a digital image;

(b) resizing each skin colored region based on one or more predetermined facial dimensions to form one or more resized skin colored regions;

(c) searching the resized skin colored regions for groups of pixels with color characteristic of redeye defect for forming a candidate redeye defect;

(d) evaluating the groups of pixels relative to one or more properties of a face to determine whether a pair of the candidate redeye defects is consistent with a facial property of an eye pair; and (e) correcting color of the pixels based on a location of the redeye defect.

41. The method as in claim 40, wherein step (a) includes: (a1) segmenting the digital image into continuous regions of uniform color and assigning a score indicating probability that the region corresponds to skin for forming a candidate skin region.

42. The method as in claim 40, wherein step (a1) includes merging two or more candidate skin regions based on their similarity of color and degree of connectivity.

43. The method as in claim 41, wherein step (a1) includes determining probability that the candidate region is a face based on its shape.

44. The method as in claim 40, wherein the match of step (d) further includes determining for a pair of candidate redeye defects the size and tilt expected of an eye based on distance between and the tilt of the pair of candidate redeye defects.

45. The method as in claim 44, wherein the match of step (d) includes correlating the region around the candidate redeye defects with individual zones of the eye template.

46. The method as claimed in claim 32 wherein resizing in step (b) is based on a predetermined distance between the eyes of a typical face.

47. The method as claimed in claim 46 wherein resizing in step (b) is based on a predetermined ratio between the width of a typical face and the distance between the eyes of a typical face.

48. The method as claimed in claim 32 wherein step (c) further comprises comparing each redeye defect to one or more facial properties of the resized skin colored regions.

49. The method as claimed in claim 48 wherein each redeye defect is compared to an eye size expected for the resized skin colored region.

50. The method as claimed in claim 32 wherein step (c) further comprises detecting pairs of redeye defects by comparing each redeye defect in the pair to one or more facial properties of the resized skin colored regions.

51. The method as claimed in claim 50 wherein the distance between each redeye defect in a pair is compared to a distance expected for the resized skin colored region.

52. The method as claimed in claim 50 wherein each redeye defect in the pair is compared to an eye size expected for the resized skin colored region.

53. A method for detecting eye color defects of a subject in an image due to flash illumination, said method comprising the steps of:

(a) searching of an entire digital image for skin-colored regions having groups of pixels with color characteristic of redeye defect for forming candidate redeye defect, said skin colored regions having a characteristic of a face;

(b) evaluating the groups of pixels relative to the determined size of a face to determine the extent to which the size of a candidate redeye defect matches an expected size of an eye pupil; and (c) correcting color of the pixels based on the evaluation of redeye defect performed in step (b).

54. The method as in claim 53, wherein the evaluation of step (b) includes correlating a region around the candidate redeye defects with an eye template.

55. A method for detecting eye color defects of a subject in an image due to flash illumination, said method comprising the steps of:

(a) searching of an entire digital image for skin-colored regions having groups of pixels with color characteristic of redeye defect for forming candidate redeye defect, said skin colored regions having a characteristic of a face;

(b) evaluating the groups of pixels relative to the size of a face to determine the extent to which the distance between a pair of the candidate redeye defects matches an expected distance between a pair of eyes; and (c) correcting color of the pixels based on a location of redeye defect found in step (b).

56. The method as in claim 55, wherein the evaluation of step (b) includes correlating a region around the candidate redeye defects with an eye template.

57. A method for detecting eye color defects of a subject in an image due to flash illumination, said method comprising the steps of:

(a) detecting groups of pixels with color characteristic of redeye defect forming a pair of candidate redeye defects;

(b) evaluating the groups of pixels relative to a distance between the redeye defects and a tilt of the redeye defects to determine the extent to which each candidate redeye defect is part of an eye; and (c) correcting color of the pixels based on the evaluation of redeye defect found in step (b).

58. The method as in claim 57, wherein the evaluation of step (b) includes correlating a region around the candidate redeye defects with an eye template.

59. A method for detecting eye color defects of a subject in an image due to flash illumination, said method comprising the steps of:

(a) searching of an entire digital image for skin-colored regions having groups of pixels with color characteristic of redeye defect for forming candidate redeye defect, said skin colored regions having a characteristic of a face;

(b) evaluating the groups of pixels relative to one or more properties of a face to determine whether a pair of the candidate redeye defects is consistent with the tilt expected of an eye based on the tilt of the pair of candidate redeye defects; and (c) correcting color of the pixels based on a location of redeye defect found in step (b).

60. The method as in claim 59, wherein the match of step (b) further includes determining for a pair of candidate redeye defects the size expected of an eye based on distance between the pair of candidate redeye defects.

61. The method as in claim 59, wherein the match of step (b) includes correlating a region around the candidate redeye defects with an eye template.

62. The method as in claim 61, wherein the match of step (b) includes correlating the region around the candidate redeye defects with individual zones of the eye template.

* * * * *